United States Patent [19]

Mathieu

[11] Patent Number: 5,539,300
[45] Date of Patent: Jul. 23, 1996

[54] POWER SUPPLY DEVICE

[76] Inventor: Serge Mathieu, 477, Savaria, Beauport (Québec), Canada, G1C 5G9

[21] Appl. No.: 282,497

[22] Filed: Aug. 1, 1994

[51] Int. Cl.$^6$ .................................................. G05F 1/12
[52] U.S. Cl. ............................ 323/249; 323/310; 363/91
[58] Field of Search ................................. 323/248, 240, 323/249, 261, 310; 363/91; 318/787, 820, 821

[56] References Cited

U.S. PATENT DOCUMENTS

| | | | |
|---|---|---|---|
| 3,573,579 | 4/1971 | Lewus | 318/787 |
| 3,573,605 | 4/1971 | Hart | 323/56 |
| 3,573,606 | 4/1971 | Hart | 323/60 |
| 3,770,365 | 11/1973 | Lenski | 431/79 |
| 4,870,534 | 9/1989 | Harford | 361/58 |
| 5,013,990 | 5/1991 | Weber | 318/814 |

*Primary Examiner*—Peter S. Wong
*Assistant Examiner*—Shawn Riley
*Attorney, Agent, or Firm*—Francis Martinbau; Pierre Lespérance

[57] ABSTRACT

A power supply for an electronic device such as the control circuitry of a thermostat. The power supply has a current transformer with a primary winding in series with the power line that is connected to the heating source, and a secondary winding coupled to the primary winding through a saturable magnetic core. A thyristor connected across the output terminals of the secondary winding establishes a momentary short-circuit condition when the voltage developed across the secondary winding exceeds a preset level in order to prevent the magnet core of the transformer from saturating.

35 Claims, 4 Drawing Sheets

POWER SUPPLY DEVICE

FIELD OF THE INVENTION

The present invention relates to a power supply particularly suitable for low wattage electronic circuits used in a household environment, such as electronic thermostats. The power supply is inductively coupled to the power line by a current transformer and is characterized by the capability of regulating the voltage across the secondary winding of the transformer in order to prevent emission of audible noise from the magnetic core which occurs when the core is in a state of saturation.

BACKGROUND OF THE INVENTION

A significant number of energy conservation programs have been adopted in the past recent years with the objective of reducing the energy consumption of electrical domestic appliances, primarily the heating system. One promising approach followed by the industry is the use of highly sophisticated electronic controllers capable of regulating the operation of the heating system in accordance with a variety of parameters.

Traditionally, electrical heating systems have been controlled by wall-mounted thermostats employing a switch for connecting or disconnecting the resistive heating elements of the heating system to the power line in dependence upon the ambient temperature. Such thermostats use a common bimetallic strip that curls when the temperature changes to mechanically actuate the switch toward the open/closed condition in order to control the power dissipation of the resistive load.

Perhaps the most obvious drawback of this simple thermostat design is the lack of automatic adjustment of the temperature set point. To achieve an efficient energy utilization while maintaining a certain level of comfort, the temperature in the room should be kept low when it is unoccupied and raised only when the room is populated. To achieve this control function with manually adjustable thermostats, the user is required to vary the temperature set point every time the occupancy of room changes, which of course is unpractical.

The electronic thermostats developed by the industry in the past recent years overcome this drawback. These devices employ programmable micro-processors that automatically adjust the temperature set point in accordance with a daily temperature evolution profile specified by the user. Typically, the user enters in the system memory datum of the desired temperature correlated to the time of the day. Once programmed, the micro-processor controls a load driver such as a relay or a power solid-state switch to regulate the operation of the resistive heating elements in order to maintain the ambient temperature as close as possible to the dynamic set point.

The electrical power required for the operation of the thermostat control circuitry can be supplied by a battery or furnished from the power line in series with the controlled load, the resistive heating elements for instance. The latter approach presents the advantage of reduced maintenance since no battery needs to be replaced. However, the power supply design is complicated in light of the requirement to extract electric energy from the power line when the latter is in different states of conduction. In this regard, it should be appreciated that a thermostat is normally installed on a wall where only two conductors are usually available, one of the conductors leading to a fuse or breaker in the switchboard of the dwelling and the other leading to the resistive heating elements. When the conductors are connected to one another, the power line loop is closed and current flows through the resistive elements. In contrast, when the conductors are disconnected from one another the electrical path of the power line is opened and the heating elements cease to function. The state of conduction of the power line is controlled by the load driver in the thermostat, either relay or solid-state switch, that is connected in series with the power line. When the load driver acquires an open condition, i.e. no current flows through the heating elements, the voltage supplied from the grid is present across the load driver terminals and provides a convenient source of power to supply the electronic control circuitry of the thermostat. This voltage can be easily stepped down, rectified, filtered and otherwise conditioned in accordance with the specific requirements. However, when the load driver assumes a closed condition, it establishes a quasi nil impedance path that only manifests an insignificant voltage drop resulting from parasitic resistive losses. Clearly, this potential is insufficient to furnish the controller circuitry with the required voltage and current for its operation. In this case, the power supply should be able to extract electric energy from the electrical current flowing in the power line.

One possibility to accomplish this objective is to provide a current transformer in series with the controlled load. The alternating current passing through the primary winding impresses via inductive coupling a current in the secondary winding. In turn, this current can be rectified and stored as a charge on a filter capacitor.

An important design criterion of the electronic thermostat is the ability to handle loads within a broad rating range. The manufacturer can thus commercialize a single model suitable for a wide variety of applications. In order to account for the different loads that the thermostat may be used with, the transformer provided to furnish the electronic control circuitry with electric power is selected to develop a sufficient voltage and current at the secondary winding when the primary winding is in series with the minimal load within the rating range of the thermostat. However, when the thermostat controls a load of increased capacity, a higher current flows in primary winding which, in turn, induces a higher secondary current. As a consequence, the value of the time integral of the voltage across the secondary winding may increase beyond the level at which the magnetic core of the transformer saturates and the core begins to emit objectionable audible noise of vibratory nature.

OBJECTIVES AND STATEMENT OF THE INVENTION

One objective of the invention is a power supply employing a current transformer that generates little or no audible noise within a wide range of currents susceptible to flow in the primary winding of the transformer.

Another objective of the invention is a device for controlling an electrical load, such as a thermostat, utilizing the aforementioned power supply.

As embodied and broadly described herein, the invention provides a power supply, comprising:

- a current transformer having a primary winding inductively coupled to a secondary winding through a saturable magnetic core, said core emitting audible noise when acquiring a state of saturation, said secondary winding being capable of energizing an electronic device in an electrical path therewith when alternating current is caused to flow through said primary winding; and a switch in an electrical path with output terminals of said secondary winding, said switch being capable of establishing a low impedance path across said output terminals for allowing a significant portion of an electrical current induced in said secondary winding to flow through said low impedance path, said switch establishing said low impedance path in response to voltage manifested at said secondary winding reaching a trigger level, said trigger level being selected to prevent said core from acquiring a state of saturation.

For the purpose of this specification a) the expression "secondary winding" refers either to a single winding or to a group of discrete windings on the magnetic core to which energy is being transferred from the primary winding of the transformer;

b) the expression "rectifier component" refers to a non-linear electrical component that enables more current to flow in one direction that in the other direction; and c) the expression "rectifier circuit" refers to an electrical network capable of converting alternating current (AC) having little or no direct current (DC) component into current with significantly higher DC component.

In a preferred embodiment, the switch is a gate controlled solid state component selected in the group consisting of transistor and silicon controlled rectifier (thyristor). Advantageously, a multi-component switch is employed to establish a bi-directional path across the output terminals of the secondary winding. For instance, a bilateral triode switch, commonly called "triac" including two thyristors in inverse-parallel connection having a single gate terminal has been found satisfactory.

The switch is selectively set in a state of conduction by a trigger circuit that injects a current pulse in the gate terminal of the switch when the voltage across the output terminals of the secondary winding reaches a preset trigger level. Actually, the voltage for actuating the switch toward the closed condition can be obtained from any point in the power supply circuit as long as the voltage at the selected observation point is related in a known and well determined manner to the voltage manifested at the secondary winding. In this regard, the expression " . . . said switch establishing said low impedance path in response to voltage manifested at said secondary winding reaching a trigger level . . . " used in the broad definition of the invention above, is intended to mean that the switch is actually triggered to establish the low impedance path by some physical phenomenon, voltage, current, etc., manifested at any point in an electrical path with the secondary winding, that is correlated to the voltage at the secondary winding in a known and a well determined manner, so a variation of the voltage at the secondary winding is accompanied by a predictable variation of said physical phenomenon.

In one embodiment, the trigger circuit employs two zener diodes that trigger the switch when the voltage across the secondary winding exceeds their reverse-breakdown potential.

Most preferably a rectifier circuit including a full-wave bridge is connected across the output terminals of the secondary winding to supply raw DC current suitable for energizing the electronic device connected to the power supply, such as the electronic circuitry of a thermostat. If desired, the raw DC current can be stored as a charge on a capacitor and otherwise conditioned in accordance with the requirement of the load.

In essence the switch and the associated trigger circuit may be categorized as an agency for regulating the impedance connected to the secondary winding in order to operate the current transformer at less than saturation flux density in the magnetic core. The saturation of the magnetic core a function of the time integral of the voltage v across the secondary winding. By selectively increasing the load connected to the secondary winding, accomplished in a preferred embodiment by short-circuiting the secondary when the voltage v reaches a predetermined level, the value of the time integral of voltage v during a half-cycle of the AC excitation can be maintained below the value at which the magnetic core saturates.

As embodied and broadly described herein, the invention also provides a power supply, comprising:

a current transformer having a primary winding inductively coupled to a secondary winding through a saturable magnetic core, said core emitting audible noise when acquiring a state of saturation, said secondary winding being capable of energizing an electronic device in an electrical path therewith when alternating current is caused to flow through said primary winding; and means in an electrical path with said secondary winding for decreasing an impedance across output terminals of said secondary winding by a determined amount in response to voltage manifested at said secondary winding reaching a trigger level, said trigger level and the amount of impedance decrease being selected to prevent saturation of said magnetic core and attendant audible noise emission.

As embodied and broadly described herein, the invention further provides a device for controlling an electrical load, said device comprising:

a load driver for connection to a power line that supplies electrical energy to the load, said load driver being capable of controlling a state of conduction of the power line;

an electronic control circuit controlling a state of conduction of said load driver for, in turn, regulating an operation of the electrical load;

a power supply for furnishing electrical energy to said electronic control circuit, said power supply including:

a) a current transformer having a primary winding in serial connection with said load driver, said primary winding being inductively coupled to a secondary winding through a saturable magnetic core, said core emitting audible noise when acquiring a state of saturation, said secondary winding being in an electrical path with said electronic control circuit for energizing said electronic control circuit when alternating current is caused to flow through said primary winding; and b) a switch in an electrical path with output terminals of said secondary winding, said switch being capable of establishing a low impedance path across said output terminals for allowing a major fraction of an electrical current induced in said secondary winding to flow through said low impedance path, said switch establishing said low impedance path in response to voltage manifested at said secondary winding reaching a trigger level, said trigger level being selected to prevent said core from acquiring a state of saturation.

DESCRIPTION OF PREFERRED EMBODIMENTS

The present invention provides a novel power supply particularly suitable for a thermostat that controls the operation of an electric heating source.

Figure 1:
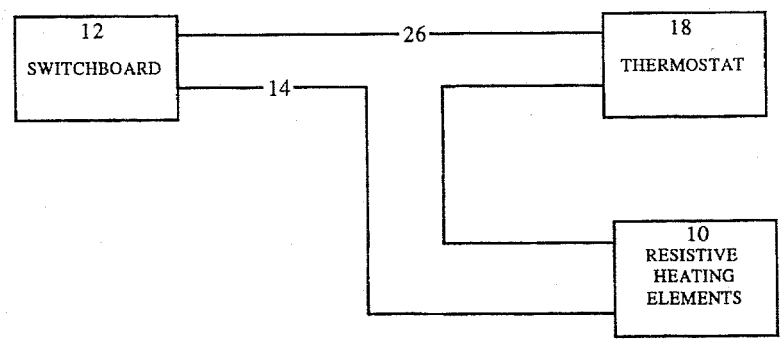
FIG. 1 is a functional block diagram of an electric heating system controlled by a thermostat.

The general layout of an electric heating system for domestic applications is illustrated in FIG. 1. A heating source in the form of resistive heating elements 10 is supplied with electric energy from a switchboard 12 through conductors 14 and 16. A thermostat 18 controls the state of conduction of the circuit loop formed by the switchboard 12, load 10 and conductors 14, 16 in order to regulate the operation of the resistive heating elements.

Figure 2:
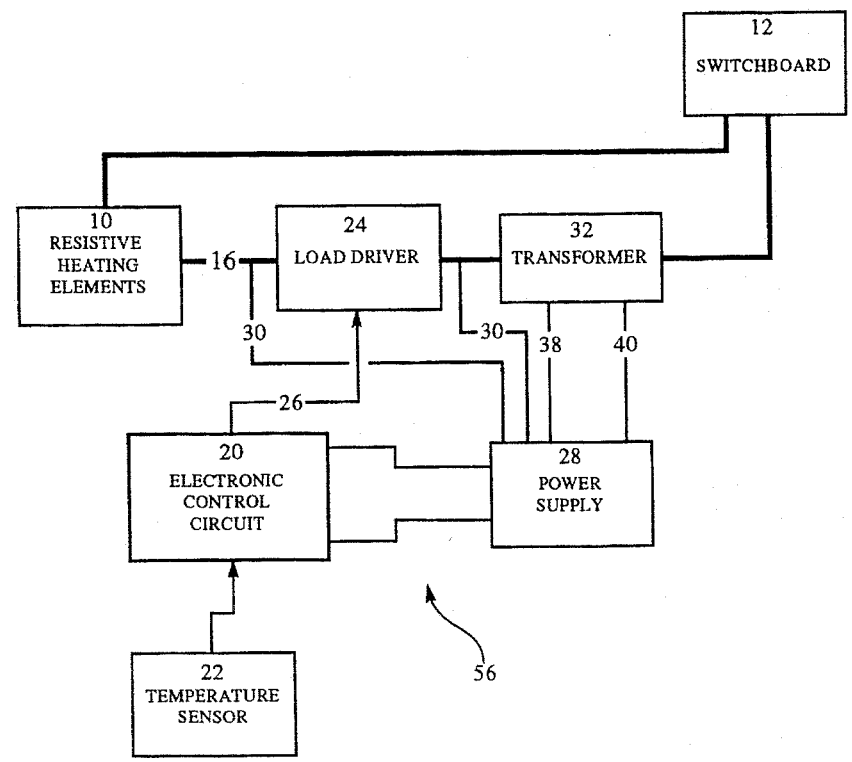
FIG. 2 is a functional block diagram of a thermostat in accordance with the invention.

FIG. 2 provides a generalized functional diagram of the thermostat 18. It comprises an electronic control circuit 20 that regulates the operation of the resistive heating elements 10. The electronic control circuit gathers temperature data from a temperature sensor 22 and energizes or de-energizes the resistive heating elements 10 in order to maintain the ambient temperature as close as possible to a set point. Usually, the set point is dynamic in that it changes during the time of the day. For instance, it may be desirable to maintain a relatively low temperature during the day when the dwelling is unoccupied in order to conserve energy, and raise the temperature to a comfort level during the evening. Adjustment of the set point during the installation of the thermostat is effected by loading in the system memory the desired temperature values correlated to respective points in time.

The industry has developed a wide variety of control circuits for thermostat applications, ranging from simple units that perform only basic functions to highly sophisticated devices. It is within the reach of the rational addressee to select the control circuit most suitable for the intended application.

A load driver 24 mounted in series with the resistive heating elements 10 is subordinated to the control influence of the electronic control circuit 20 for regulating the operation of the heating elements 10. The load driver 24 is a relay or solid-state switch such as a thyristor that controls the state of conduction of the power line 16. The load driver acquires the closed condition or the opened condition in response to a command signal issued by the electronic control circuit on line 26.

The voltage and the current necessary for the operation of the electronic control circuit 20 is provided by a power supply 28 that feeds from the power line 16. The power supply 28 is characterized by the ability to adequately gather electrical energy when the power line 16 is either in the opened state of conduction or in the closed state of conduction. When the load driver 24 is opened no current flows in the power line 16, hence the grid voltage available at the switchboard 12 is now transferred across the terminals of the load driver 24. As it will be described in greater detail later, this voltage, applied to the power supply 28 via conductors 30 is stepped-down, rectified and filtered in order to energize the electronic control circuit 20.

Figure 3:
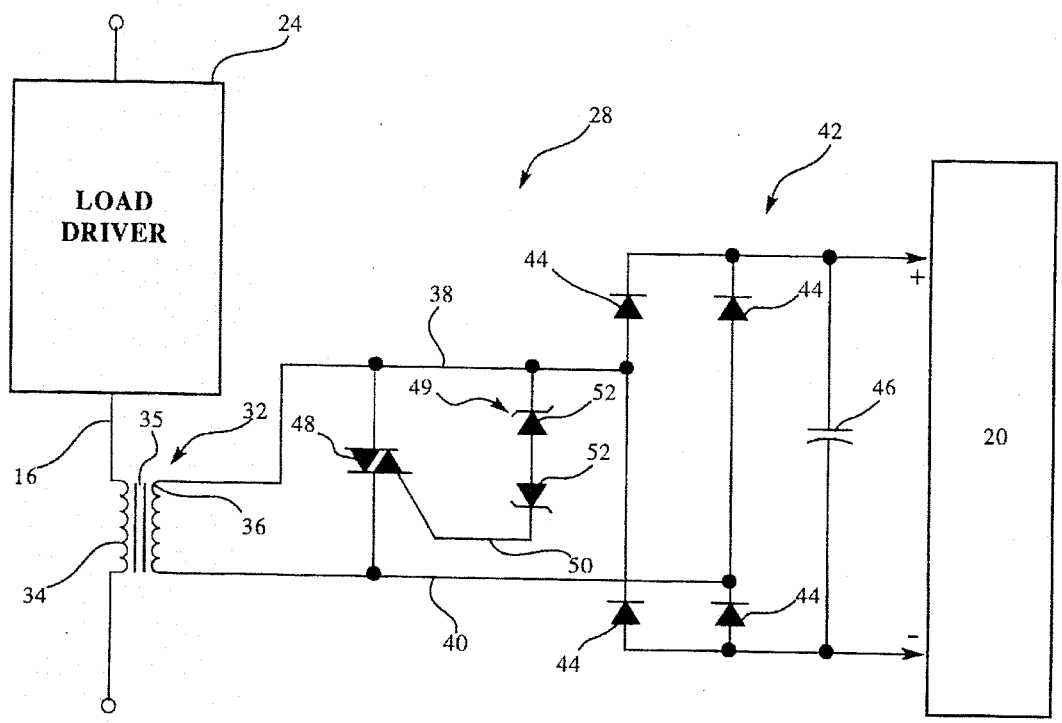
FIG. 3 is a fragmentary schematic diagram of a power supply of the thermostat shown in FIG. 2.

However, when the load driver 24 closes, no meaningful potential drop is readily available to the power supply 28. To maintain the electronic control circuit fully energized, a current transformer 32 is provided to generate current as a result of time-varying flux induced by alternating current passing in the power line 16. With reference to FIG. 3, the current transformer 32 comprises a primary winding 34 in the electrical path of power line 16, hence in series with the load driver 24 and with the resistive heating element 10. The primary winding 34 is coupled to a secondary winding 36 through a magnetic core 35 built of laminations or alloy sheet steel assembled into a stack.

The output terminals 38 and 40 of the secondary winding are connected to a rectifier circuit in the form of a full-wave bridge 42 including four (4) diodes 44. The raw DC current generated by the rectifier bridge 42 is filtered by a capacitor 46 and then supplied to the electronic control circuit 20. A power switch 48 in the form of a triac is connected across the secondary winding 36 to selectively establish a short-circuit in order to prevent the magnetic core 35 from becoming saturated. The triac 48 is set in conduction by a trigger circuit 49 connected across the gate terminal 50 of the triac and the output terminal 38 of the secondary winding. The trigger circuit 49 includes a pair of zener diodes 52 in inverse-serial connection. In light of the fact that the impedance of the electric path from the gate terminal 50 to the output terminal 40 of the secondary winding is very low and for all practical purposes negligible, the voltage across the pair of zener diodes 52 is approximately the same as the voltage across the secondary winding 36.

In a variant, the trigger circuit 49 may be constituted by a operational amplifier wired in a comparator configuration. The input of the operational amplifier may be connected either upstream or downstream the rectifier bridge 42. It is not deemed necessary to provide a detailed description of this embodiment in light of the fact that operational amplifiers and their mode of operation are well known to those skilled in the art.

As briefly discussed in the introductory portion of this application, the thermostat 18 should have the ability of handling heating loads within a wide current rating range, typically from one (1) ampere (A) to twenty (20) A. This implies that the current transformer must be designed to effect a sufficient energy transfer per unit of time at a current of one (1) A in the primary winding 34 to satisfy the power requirement of the electronic control circuit 20. With the above in mind it will become apparent that when the current in the primary winding 34 increases to say fifteen (15) A, the power transfer taking place greatly exceeds what the electronic control circuit can consume.

The power switch 48 and the trigger circuit 49 are provided specifically to prevent the magnetic core 35 from becoming saturated in order to maintain the current transformer 32 silent. When the voltage across the output terminals of the secondary winding 36 exceeds the breakdown voltage of the zener diode 52 that is currently reverse biased, the trigger circuit 49 begins to conduct and injects a current pulse in the gate terminal of the triac 48. In turn, the triac 48 is set in conduction and massively short-circuits the secondary winding 36 so as to reduce the value of the time integral of the voltage during a half-cycle below the value at which saturation of the core 35 occurs. This feature will be best understood with reference to FIGS. 4a and 4b.

Figure 4A:
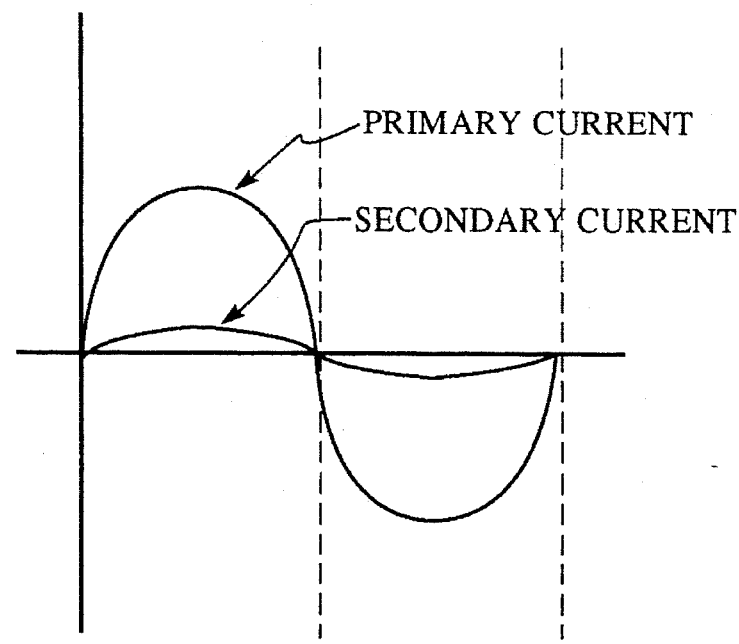
FIG. 4a is a diagram of the time-current variation in the primary and in the secondary winding of the current transformer employed in the thermostat power supply.

FIG. 4a illustrates the relationship between the current flowing in the primary winding 34 and in the secondary winding 36. It is apparent that both currents are in phase, differing only in magnitude due to a non-unitary ratio $N_1/N_2$ where $N_1$ is the number of turns in the primary winding 34 and $N_2$ is the number of turns in the secondary winding 36. The diagram also reveals that the secondary winding 36 essentially behaves as a source of electrical current, not voltage. This is due to the environment in which the current transformer 32 is being used. More particularly, the current transformer 32 is selected to present a very low impedance across the primary winding 34 in order to be as electrically transparent as possible in the power line 16. As a consequence, the current flowing in the power line 16, hence in the primary winding 34 is largely determined by the impedance of the resistive heating elements 10. Stated otherwise, the power line 16 forces through the primary winding 34 a predetermined current that calls into existence a predetermined current into the secondary winding 36.

The voltage across the output terminals 38 and 40 is dependent upon the impedance connected to the secondary winding 36. In the example under consideration, the impedance is primarily of capacitive nature due to the presence of capacitor 46, so the voltage can be approximated by (assuming the initial charge in capacitor 46 to be nil):

$$v = 1/C \int di/dt$$

where C is the capacitance of the capacitor 46.

This relationship shows that during a given half-cycle the voltage across the secondary winding 36 increases very rapidly in order to maintain through the capacitor 46 the current called for by the primary winding 34.

Figure 4B:
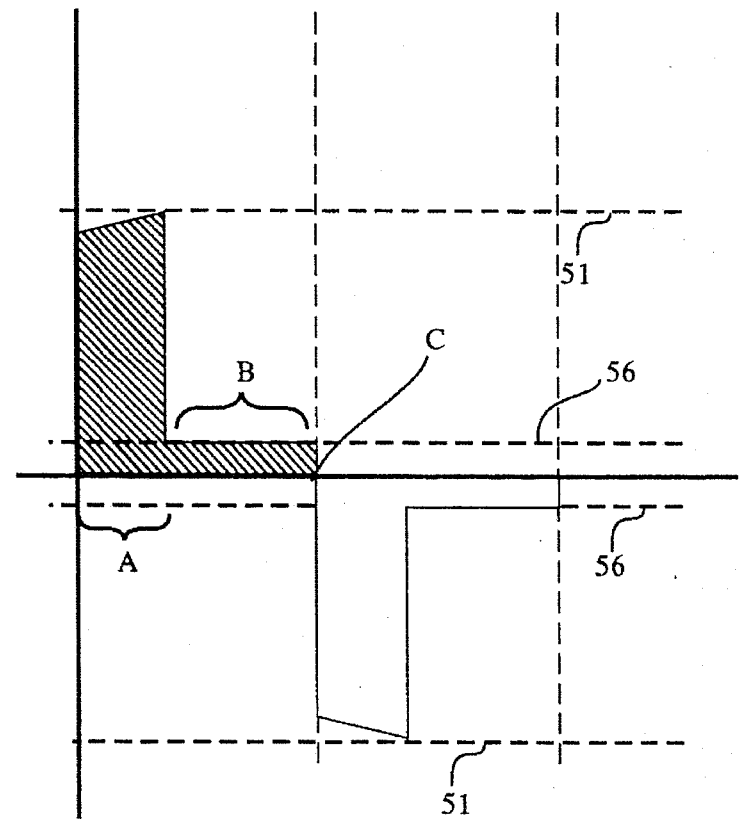
FIG. 4b is a diagram of the time-voltage variation across the secondary winding of the current transformer employed in the thermostat power supply.

The magnetic core 35 saturates when the value of the time integral of the voltage across the secondary winding 36 over a half-cycle exceeds a predetermined constant that is determined by the physical characteristics of the current transformer. The value of the time integral of the voltage is actually the area under the voltage curve in a voltage-time diagram. To avoid saturation of the magnetic core 35 this area should be kept at all times below the value at which saturation occurs. This is precisely the purpose of the triac 48 and the associated trigger circuit 49, as best shown in FIG. 4b that depicts the voltage waveform with relation to time across the terminals of the secondary winding 36. In the diagram, the horizontal dotted lines 51 are the breakdown-voltage levels of the zener diodes 52, while the lines 56 represent the voltage level when the triac 48 is set in conduction.

At the initial stage of a positive half-cycle of the voltage, the potential across the secondary winding 36 begins to increase and charges the capacitor 46 (portion A). When the voltage reaches the breakdown value 51 of the currently reverse biased zener diode 52, the triac 48 is triggered and assumes the closed condition, thus short-circuiting the secondary winding 36 and causing the voltage across its terminals to collapse to level 56. The triac 48 remains closed during the portion B of the first half-cycle and opens only at point C as a result of line commutation when the current falls to zero. The process is repeated during the negative half-wave of the cycle.

The selective short circuiting of the secondary winding can also be described as a reduction of the impedance (increase of the load) connected to the secondary winding 36 which has the effect of reducing the voltage required to maintain the current in the secondary winding 36 as required by the current in the primary winding 34.

It will now become apparent that saturation of the magnetic core 35 is avoided when the breakdown levels 51 are set sufficiently low so the area under the voltage curve (the area with hatched lines) does not exceed the value at which saturation occurs.

Another point that should be mentioned is the secondary function of the rectifier bridge 42. In addition to performing an AC to DC converter function it also isolates the electronic control circuit 20 from the periodic short-circuiting of the secondary winding 36. More specifically, the diodes 44 prevent any reverse flow of current from any point of the circuit (including the electronic control circuit 20) downstream the rectifier bridge 42, such as from the filtering charged capacitor 46, through the triac 48. It will also be apparent that during the time period the secondary winding 36 is short-circuited, the transformer ceases temporarily to pump the capacitor 46 through the diodes 44. At this point, however, the capacitor 46 maintains the electronic control circuit energized by releasing stored charges. Note that the size of the capacitor 46 and the voltage breakdown level 51 of zener diodes 52 should be selected so that on one hand the value of the voltage time integral during a half-cycle is below the saturation level and on the other hand the capacitor 46 accumulates enough charges during period A to maintain the electronic control circuit 20 fully energized during period B.

Figure 5:
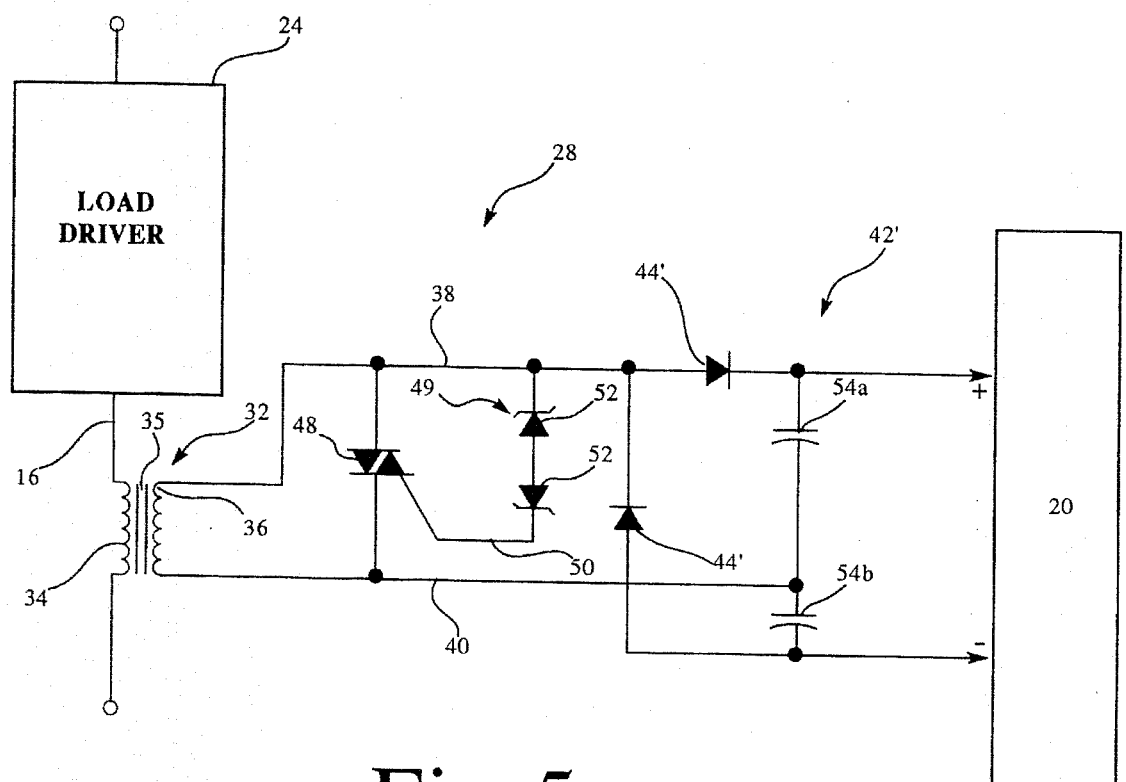
FIG. 5 is a fragmentary schematic diagram of a thermostat power supply in accordance with a variant.

FIG. 5 illustrates a variant of the power supply 28. The variant employs a voltage doubler rectifier circuit 42' including a pair of diodes 44' charging capacitors 54a and 54b in serial arrangement. By using a voltage doubler rectifier circuit a physically smaller current transformer can be employed since what the current transformer only needs to supply across the secondary winding 36 is half the voltage required across the branch of capacitors 54a and 54b.

Figure 6:
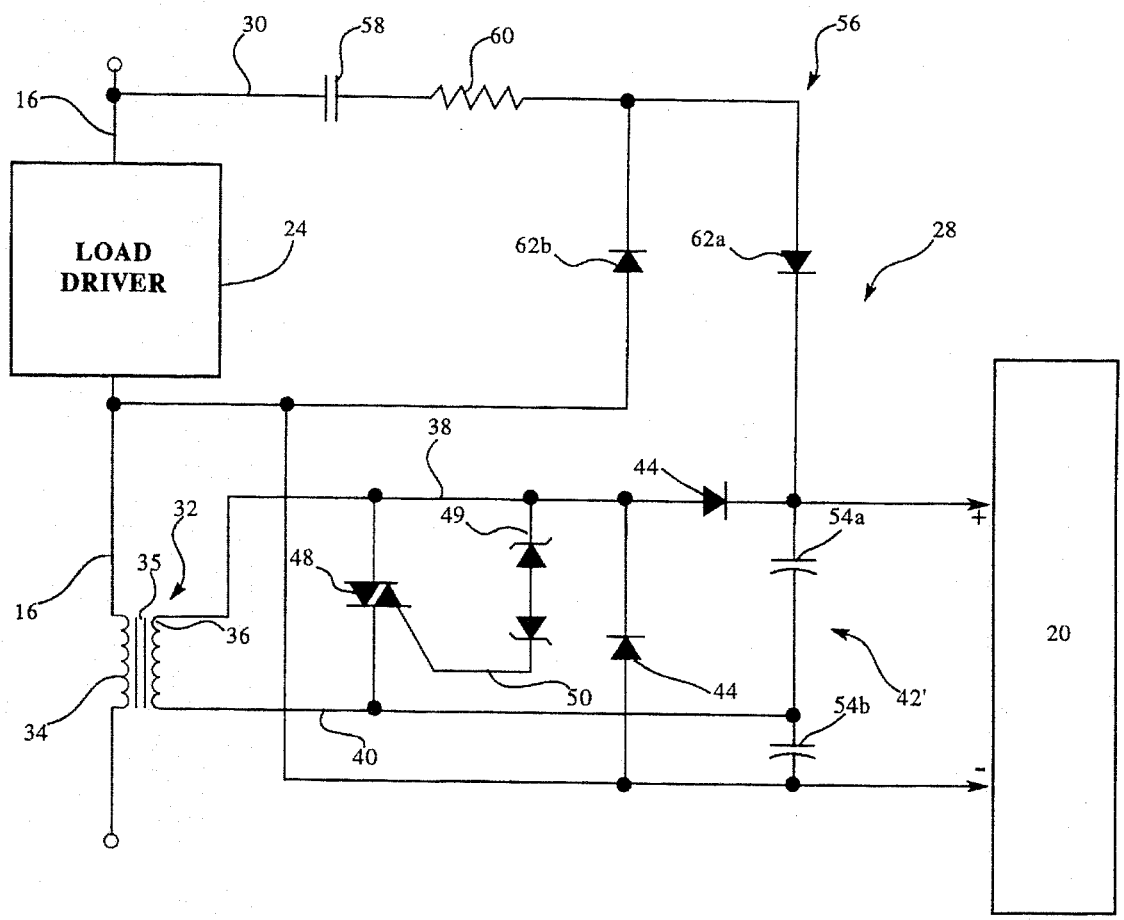
FIG. 6 is a schematic diagram of a thermostat power supply in accordance with a further variant.

FIG. 6 is a more complete representation of the power supply 28 employing the voltage doubler rectifier circuit 42', also showing a charging circuit 56 for the capacitors 54a and 54b used when the load driver 24 is in the opened condition. The charging circuit 54 includes a capacitor 58 in series with a resistor 60 in the conductor 30 that is coupled to the power line 16. The capacitor 58 and the resistor 60 are connected through diodes 62a and 62b to respective terminals of the capacitors 54a and 54b circuit. During the positive voltage half-cycle on power line 16 the diode 62a conducts to charge the capacitors 54a and 54b. During the negative half-cycle, the diode 62b conducts and causes a charge to accumulate on capacitor 58, which charge is then transferred over to capacitors 54a and 54b. It will be noted that the voltage developed across either one of capacitors 54a and 54b corresponds to the potential across the load driver 24 less the voltage drop across the capacitor 58 and resistor 60.

The above description of a preferred embodiment should not be interpreted in any limiting manner since refinements and variations are possible without departing from the spirit of the invention. For instance, the current transformer may be provided with a pair of discrete secondary windings, one used for supplying current to the electronic control circuit 20, the other comprising the triac 46 to bring about the impedance decrease effect when the voltage across the primary winding exceeds a preset level. Moreover, the power supply can be used with a wide variety of electronic control devices, other than thermostats. One possible example of alternative use is a lighting control system.

The scope of the invention is defined in the appended claims and their equivalents.

I claim:

1. A power supply, comprising:

a current transformer having a primary winding inductively coupled to a secondary winding through a saturable magnetic core, said core emitting audible noise when acquiring a state of saturation, said secondary winding being capable of energizing an electronic device in an electrical path therewith when alternating current is caused to flow through said primary winding; and a switch in an electrical path with output terminals of said secondary winding, said switch providing means to reduce emissions of audible noise from said magnetic core said switch being capable of establishing a low impedance path across said output terminals for allowing a significant portion of an electrical current induced in said secondary winding to flow through said low impedance path, said switch establishing said low impedance path in response to voltage manifested at said secondary winding reaching a trigger level, said trigger level being selected to prevent said core from acquiring a state of saturation, if said voltage would exceed said trigger level said magnetic core being susceptible to emit audible noise.

2. A power supply as defined in claim 1, wherein said switch is capable of assuming either one of a first and second operative states, in said first operative state said switch establishing said low impedance path across said output terminals, in said second operative state said switch establishing a significantly higher impedance path across said output terminals than in said first operative state.

3. A power supply as defined in claim 2, wherein said switch acquires said second operative state in response to termination of current flow therethrough.

4. A power supply as defined in claim 3, wherein said switch is a solid-state device having a gate terminal for receiving a signal that switches said solid state device to a state of conduction that corresponds to said first operative state.

5. A power supply as defined in claim 2, wherein said switch is selected from the group consisting of thyristor and transistor.

6. A power supply as defined in claim 4, comprising a trigger circuit coupled to said gate terminal for actuating said solid-state device toward said state of conduction when a voltage across said secondary winding reaches said trigger level.

7. A power supply as defined in claim 6, wherein said trigger circuit includes a zener diode in an electrical path between an output terminal of said secondary winding and said gate terminal.

8. A power supply as defined in claim 6, wherein said trigger circuit includes a pair of zener diodes in an inverse serial connection, said pair of zener diodes being in an electrical path between an output terminal of said secondary winding and said gate terminal.

9. A power supply as defined in claim 7, wherein said zener diode has a reverse-breakdown voltage selected in order to prevent said core from becoming saturated during an operation of said current transformer.

10. A power supply as defined in claim 2, comprising a rectifier component connected to one of said output terminals, said rectifier component establishing an unidirectional electrical path between said switch and the electronic device energized by said power supply, said rectifier component allowing current flow in one direction when said switch assumes said second operative state and preventing current flow in an opposite direction when said switch assumes said first operative state.

11. A power supply as defined in claim 10, wherein said rectifier component is a diode.

12. A power supply as defined in claim 10, comprising a charge storage device constituting means for supplying electrical energy to the electronic device when said switch assumes said first operative state.

13. A power supply as defined in claim 12, wherein said charge storage device includes a capacitor.

14. A power supply as defined in claim 1, comprising a rectifier circuit for supplying the electronic device with current having a DC component.

15. A power supply as defined in claim 14, wherein said rectifier circuit includes a diode bridge and a filtering capacitor.

16. A power supply as defined in claim 14, wherein said rectifier circuit constitutes means for increasing a magnitude of voltage impressed across said output terminals.

17. A power supply, comprising:

a current transformer having a primary winding inductively coupled to a secondary winding through a saturable magnetic core, said core emitting audible noise when acquiring a state of saturation, said secondary winding being capable of energizing an electronic device in an electrical path therewith when alternating current is caused to flow through said primary winding; and means to reduce emissions of audible noise from said magnetic core, said means being in an electrical path with said secondary winding and being capable of decreasing an impedance across output terminals of said secondary winding by a determined amount in response to voltage manifested at said secondary winding reaching a trigger level, said trigger level and the amount of impedance decrease being selected to substantially prevent saturation of said magnetic core and attendant audible noise emission, if said voltage would exceed said trigger level said magnetic core being susceptible to emit audible noise.

18. A device for controlling an electrical load, said device comprising:

a load driver for connection to a power line that supplies electrical energy to the load, said load driver being capable of controlling a state of conduction of the power line;

an electronic control circuit controlling a state of conduction of said load driver for, in turn, regulating an operation of the electrical load;

a power supply for furnishing electrical energy to said electronic control circuit, said power supply including:

a) a current transformer having a primary winding in serial connection with said load driver, said primary winding being inductively coupled to a secondary winding through a saturable magnetic core, said core emitting audible noise when acquiring a state of saturation, said secondary winding being in an electrical path with said electronic control circuit for energizing said electronic control circuit when alternating current is caused to flow through said primary winding; and b) a switch in an electrical path with output terminals of said secondary winding, said switch providing means to reduce emissions of audible noise from said magnetic core, said switch being capable of establishing a low impedance path across said output terminals for allowing at least a fraction of an electrical current induced in said secondary winding to flow through said low impedance path, said switch establishing said low impedance path in response to voltage manifested at said secondary winding reaching a trigger level, said trigger level being selected to prevent said core from acquiring a state of saturation, if said voltage would exceed said trigger level said magnetic core being susceptible to emit audible noise.

19. A device for controlling an electrical load as defined in claim 18, wherein said power supply further includes an electrical network capable of furnishing electrical energy to said electronic control circuit from the power line when said load driver is in an opened condition and prevents electrical current from passing through said primary winding.

20. A device for controlling an electrical load as defined in claim 19, wherein said electrical network includes a rectifier circuit for supplying the electronic device with voltage and current having a DC component.

21. A device for controlling an electrical load as defined in claim 20, wherein said rectifier circuit is capacitively coupled to the power line.

22. A power supply as defined in claim 18, wherein said switch is capable of assuming either one of a first and second operative states, in said first operative state said switch establishing said low impedance path across said output terminals, in said second operative state said switch establishing a significantly higher impedance path across said output terminals than in said first operative state.

23. A power supply as defined in claim 22, wherein said switch acquires said second operative state in response to termination of current flow therethrough.

24. A power supply as defined in claim 22, wherein said switch is a solid-state device having a gate terminal for receiving a signal that actuates said solid state device toward a state of conduction corresponding to said first operative state.

25. A power supply as defined in claim 24, comprising a trigger circuit coupled to said gate terminal for actuating said solid-state device toward said state of conduction when a voltage across said secondary winding reaches said trigger level.

26. A power supply as defined in claim 25, wherein said trigger circuit includes a zener diode in an electrical path between an output terminal of said secondary winding and said gate terminal.

27. A power supply as defined in claim 25, wherein said trigger circuit includes a pair of zener diodes in an inverse serial connection, said pair of zener diodes being in an electrical path between an output terminal of said secondary winding and said gate terminal.

28. A power supply as defined in claim 26, wherein said zener diode has a reverse-breakdown voltage selected to prevent said magnetic core from saturating.

29. A power supply as defined in claim 22, comprising a rectifier component connected to one of said output terminals, said rectifier component establishing an unidirectional electrical path between said switch and said electronic control circuit, said rectifier component allowing current flow in one direction when said switch assumes said second operative state and preventing current flow in an opposite direction when said switch assumes said first operative state.

30. A power supply as defined in claim 29, wherein said rectifier component is a diode.

31. A power supply as defined in claim 29, comprising a charge storage device constituting means for supplying electrical energy to said electronic control circuit when said switch assumes said first operative state.

32. A power supply as defined in claim 18, comprising a rectifier circuit connected to said output terminals for supplying the electronic device with current having a DC component.

33. A power supply as defined in claim 32, wherein said rectifier circuit includes a diode bridge and a filtering capacitor.

34. A power supply as defined in claim 33, wherein said rectifier circuit constitutes means for increasing a magnitude of voltage impressed across said output terminals.

35. A power supply as defined in claim 18, wherein the electrical load is a source of heat.

* * * * *